Figure 3:
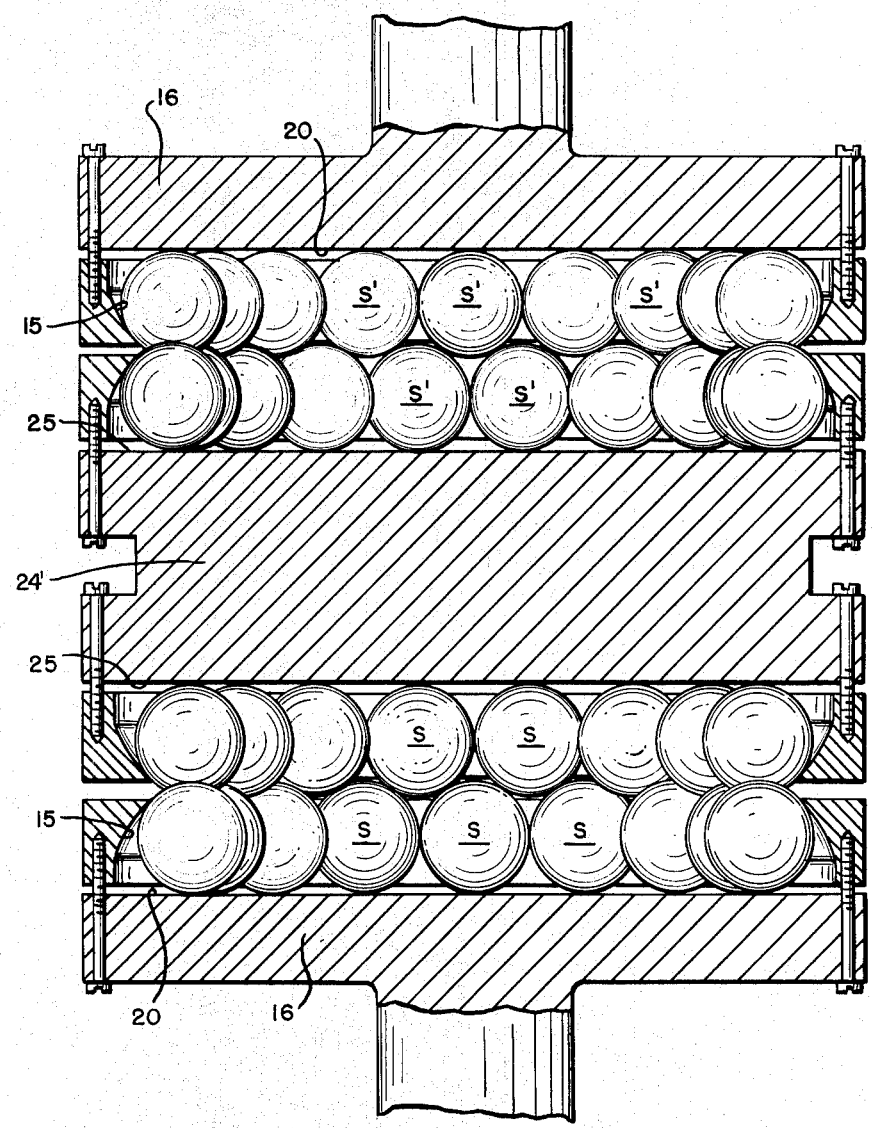

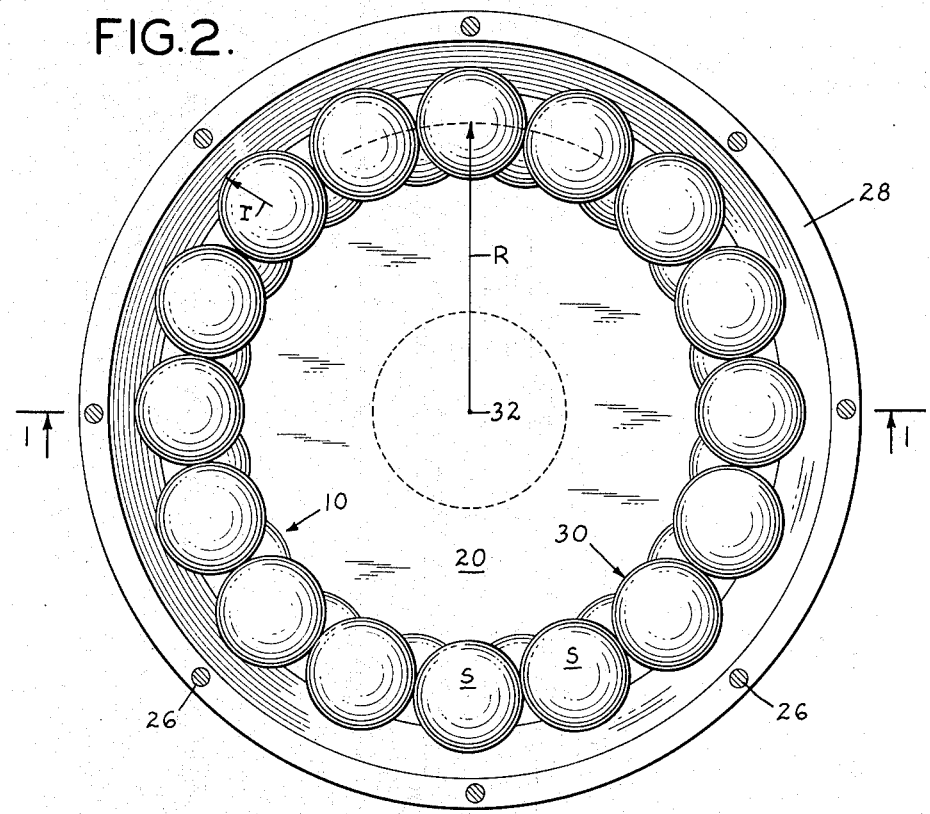
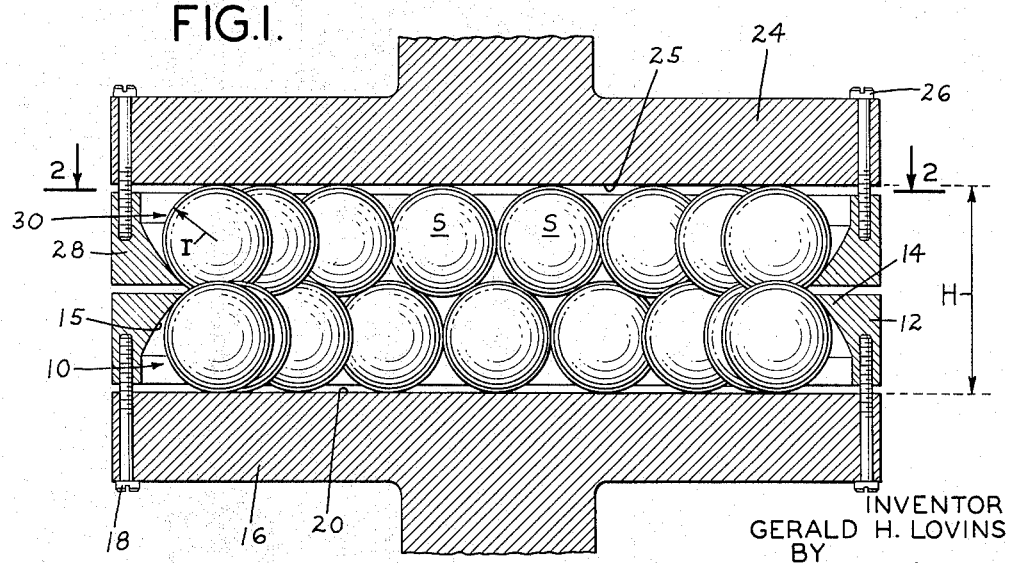

Feb. 1, 1966  G. H. LOVINS  3,231,980
DIVIDING HEAD
Filed Aug. 13, 1962  2 Sheets-Sheet 2

INVENTOR
GERALD H. LOVINS
BY Pennie, Edmonds,
Morton, Taylor and Adams
ATTORNEYS

United States Patent Office 3,231,980
Patented Feb. 1, 1966

3,231,980
DIVIDING HEAD
Gerald H. Lovins, Amherst, Mass., assignor to Kollmorgen Corporation, Northampton, Mass., a corporation of New York
Filed Aug. 13, 1962, Ser. No. 216,469
6 Claims. (Cl. 33—174)

This invention relates to improvements in devices for precise angular measurement, and more particularly to an improved precision angular measuring tool for use in machine shops and the like.

Modern industrial requirements for high precision products depend upon extremely accurate measuring devices readily adaptable to mass production industrial techniques.

One type of precision angular measurement equipment includes two co-operating discs mounted on a central shaft or spindle. Radial serrations cut into the peripheries of the co-operating disc interfaces provide the necessary incremental angular divisions. By moving one disc a specific number of serrations relative to the other disc, angles can be determined to an accuracy of .01" of arc with present tool and gauge making capabilities.

Other precision angular measurement devices utilize two co-acting annular arrays of bearing balls pressed into grooves or races cut in the faces of two co-acting discs. The discs are connected to each other by means of a centrally positioned spindle or shaft. A reasonably precise angle can be subtended by moving one disc a specific number of balls or spheres relative to the other disc. However, misalignment of the central shaft or spindle will prevent the co-acting discs from being properly centered relative to each other and cause a loss of accuracy. Moreover, precise radial serrations can be machined on the periphery of the co-acting discs only with great difficulty, while grooves for the retention of the co-acting spheres cannot be machined with the accuracy required in modern industrial metrology. Force fitting these spheres into the grooves causes an uncontrolled brinelling of the groove surfaces, resulting in a further loss of accuracy.

With the present invention, central shaft or spindle alignment problems can be avoided, highly accurate radial serrations are unnecessary and uncontrollable groove deformation does not present a problem.

In accordance with the present invention a highly accurate device for measuring angles includes two opposed annular arrays of spheres, such as conventional bearing balls, each array being retained in position on a support by mutual engagement of the spheres and the corresponding support.

For a better understanding of the present invention reference may be had to the accompanying drawings in which:

FIGURE 1 is a side view of the invention in section taken along line 1—1 of FIGURE 2;
FIGURE 2 is a top view of the invention taken in section along the line 2—2 of FIGURE 1; and
FIGURE 3 is a side view of the invention showing a stacked assembly.

As shown in FIGURE 1 an annular array 10 of like spheres S or substantially identical elements of circular cross section is positioned by means of a circumferential retaining ring or support 12. The support 12 is provided with an inwardly extending flange 14. An inner surface 15 of the flange 14 ground conically, spherically or to any other suitable shape, is in tangential contact with the array 10 of spheres S. The retaining ring 12 is fastened to a baseplate 16 by means of screws 18, although any other method of fastening can equally well be used. The baseplate 16 is provided with a plane or reference surface 20 which supports the annular array 10 so that any plane passed through the center of any sphere S in the array and parallel to the plane 20, will intersect the centers of all the other spheres S in the array 10.

A substantially identical structure superimposed on the spherical array 10 is provided with a baseplate 24 having a plane surface 25, fastening means 26, a retaining ring 28 and an annular array 30 of spheres. The superimposed array 30 of spheres is placed in contact with the corresponding array 10 so that each sphere in both assemblies is in tangential contact with two spheres in the adjacent assembly.

As shown in FIGURE 1, the tangential contact between all of the spheres, the retaining ring 12 and the plane surface 20, prevent outward and downward movement of the spheres S of array 10 and tightening of the screws 18 provides a resultant force urging each of the individual spheres in the array 10 radially inward. However, as shown in FIGURE 2, the mutual tangential interengagement of each individual sphere with each of the two tangentially adjoining spheres prevents the radially inward and axial movement of the spheres. Thus the mutual interaction between each of the spheres in each annular array 10 and 30, the plane surfaces 20 and 25 and the supports 12 and 28 retains the spheres in precise annular arrays 10 and 30 without introducing inaccuracy through the use of a grooved race or interior retaining ring.

The angle subtended by each sphere is $360°/n$, where $n$ is the number of spheres in each individual array. The radius R of the annular spherical array 10 is related to the radius R of one of the spheres according to the equation $$R = \frac{r}{\sin\left(\dfrac{\pi}{n}\right)}$$

Consequently, for any given number, $n$, of spheres with uniform radii $r$, arranged in annular arrays 10 and for example, 30, a circle of radius R is determined. Similarly, the two superimposed annular sets each of $n$ spheres and each sphere of radius $r$, placed in contact with each other in the manner shown in FIGURE 1 the separation, H, between the planes 20 and 25 is determined according to the equation:

$$H = 2r + 2R\sqrt{\sin\left(\frac{3\pi}{2n}\right)\sin\left(\frac{\pi}{2n}\right)}$$

Hence, in a practical system the height of each support, 12 and 28, must be less than $H/2$ and greater than $r$.

In operation, by placing two assemblies so the annular arrays of balls are superimposed in tangential contact as shown in FIGURE 1 the assemblies are centered accurately and such that the surfaces 20 and 25 are parallel. Any line passing normally through center 32 of the plane 20 will also be perpendicular to and pass through the center of the plane 25.

Thus, the invention provides an automatically self-centering measuring device without the need for a central spindle or shaft, thereby eliminating a source of inaccuracy introduced by possible spindle misalignment. By rotating either support 16 or 24 through an angle subtended by approximately $x$ spheres and reengaging the arrays an angle $\theta$ is measured according to the expression:

$$\frac{360°(x)}{n} = \theta$$

Moderate compressive forces can be applied to the engaged assemblies so that the spheres are uniformly engaged in tangential contact. The compressive forces impressed upon the engaged assemblies must not, however, cause brinelling of the plane surfaces 20 and 25 tangent to the spheres. Any permanent deformation of the plane surfaces 20 and 25 caused by an excessive loading will destroy the high accuracy of the device. However, shop, or tool set-up needs may require angular measurement devices to support some additional load. Heretofore angular measurement equipment has been limited to vertically imposed loads of approximately 500 lbs. or less. Measuring devices embodying this invention are capable of sustaining a vertical load of approximately 1600 lbs. without damage.

Furthermore, according to the invention it is possible to mount or stack groups of assemblies one over the other thus achieving finer graduations or angular increments. Such an assembly as shown in FIGURE 3; and it will be noted from this figure that the device includes a common baseplate 24' and that each of the arrays at the top of the unit will include two more spheres S' than the number of spheres S in the arrays at the bottom. The smallest angular increment measurable with such a stacked assembly will depend on the difference in the number of spheres provided in each of the two sets of arrays. For example, a device containing two spherical arrays, each array containing 36 spheres, provides angular graduations in 10° increments, while a device having 40 spheres per array provides angular increments of 9°. By superimposing the two assemblies, one over the other, angular increments of 1° can be determined.

Moreover, single or multiple assemblies can also be provided with plane mirrors for optional tooling purposes.

As an illustration of the accuracy and utility of the invention, assume 36 spheres each of ½" radius in each annular array. The radius R of the annulus is computed to be 5.735". Selecting the commonly used class 3 bearing balls of the five bearing ball sphericity classes generally available provides a sphericity of .000003" and a size tolerance ±.000003". Plane steel discs can be ground and lapped to a tolerance within .000005" by conventional tool and gauge making techniques. The inwardly depending retaining ring surface can also be ground by conventional techniques either conically or spherically to within .000005". By mathematically combining these machining accuracies through conventional error analysis the particular configuration selected can be shown to be accurate to within less than 0.01" of arc.

As is apparent from the foregoing, the present invention provides an extremely accurate apparatus for precise angular determination.

While a representative embodiment of the present invention has been shown and described for purposes of illustration, various changes and modifications may be made therein as pointed out above without departing from the principles of this invention. Therefore, all such changes and modifications are included within the intended scope of the invention as defined by the following claims.

I claim:

1. A device for the precise determination of angles, comprising two annular arrays of spherical elements in superimposed relationship, flanged outer circumferential retaining means for restraining each of said spherical elements in each of said annular arrays only against radial outward movement and for maintaining each spherical element in engagement with adjacent elements, and a planar baseplate facing and supporting each of said retaining means and the corresponding annular array of spherical elements with the planar portion thereof extending beyond the maximum extent of the spherical elements whereby one of said annular arrays can be selectively moved to a second position thereby subtending a precise angle.

2. A device for the precise determination of angles according to claim 1 comprising a plurality of superimposed annular arrays thereby permitting the precise determination of small angular increments.

3. An apparatus for precisely subtending angles, comprising two members each having a plane surface, a separate annular array of like spheres engaging each of said surfaces with each of said plane surfaces extending beyond the maximum extent of the spheres, said arrays being of the same diameter, inwardly extending flange means on said members for defining only the outer circumference of each annular array by circumferentially engaging and retaining said spheres in each of said annular arrays in mutually engaging tangenial contact, said annular arrays being superimposed in contacting opposed relations.

4. An apparatus for precisely subtending angles according to claim 3 wherein a plurality of said annular arrays are superimposed thereupon, whereby the precise measurement of small angular increments can be accomplished.

5. Apparatus in accordance with claim 3, wherein the inner flange surface defining the outer circumference of each annular array is spherical.

6. Apparatus in accordance with claim 3, wherein the inner flange surface defining the outer circumference of each annular array is conical.

References Cited by the Examiner

UNITED STATES PATENTS

| | | | |
|---|---|---|---|
| 420,278 | 1/1890 | Miller | 33—174 |
| 3,088,340 | 5/1963 | Shotey | 74—813 |
| 3,091,133 | 5/1963 | Hoeger | 74—826 |
| 3,091,134 | 5/1963 | Thompson et al. | 74—826 |
| 3,091,135 | 5/1963 | Thompson | 74—826 |

FOREIGN PATENTS 621,298   4/1949   Great Britain.

ISAAC LISANN, *Primary Examiner.*